United States Patent [19]

Reinke et al.

[11] Patent Number: 4,908,608

[45] Date of Patent: Mar. 13, 1990

[54] ALARMCARD

[76] Inventors: Dana J. Reinke, 1053 NW. 166th St., Seattle, Wash. 98177; D'Arcy A. J. Dawe, 19515 NE. 181st, Woodinville, Wash. 98072

[21] Appl. No.: 226,787

[22] Filed: Aug. 1, 1988

[51] Int. Cl.[4] .......................... G08B 13/14; G06F 7/04

[52] U.S. Cl. ................................ 340/571; 340/825.31

[58] Field of Search .................... 340/568, 571, 825.31, 340/426, 542–543, 825.32, 533, 531, 506, 514, 636; 361/172; 235/380, 382

[56] References Cited

U.S. PATENT DOCUMENTS

| | | | |
|---|---|---|---|
| 4,284,983 | 8/1981 | Lent | 340/568 |
| 4,327,360 | 4/1982 | Brown | 340/571 |
| 4,581,606 | 4/1986 | Mallory | 340/506 X |
| 4,638,293 | 1/1987 | Min | 340/426 |
| 4,654,640 | 3/1987 | Carll et al. | 340/568 |
| 4,673,914 | 6/1987 | Lee | 361/172 X |
| 4,680,574 | 7/1987 | Ruffner | 340/571 |
| 4,683,462 | 7/1987 | Takeda et al. | 340/571 |
| 4,805,233 | 2/1989 | Robitschko et al. | 340/568 X |
| 4,806,926 | 2/1989 | Nakamura | 340/825.31 |
| 4,808,981 | 2/1989 | Seibold | 340/568 |

*Primary Examiner*—Glen R. Swann, III
*Assistant Examiner*—Thomas J. Mullen, Jr.
*Attorney, Agent, or Firm*—Russell W. Illich

[57] ABSTRACT

A security device for use with equipment having a microprocessor that produces a warning from a warning device such as an alarm if the equipment is changed from a predetermined condition. The change from the predetermined condition can be caused by loss of power to the equipment, physical movement of the equipment, or both. The security device includes an interface means to allow information such as passwords, battery checks, alarm tests, and alarm arming sequences to be passed between the equipment (via its microprocessor) and the security device. The warning device includes a latching mechanism for continuously producing the warning signal until some reset action is undertaken. A password can be used to arm the warning device. If the equipment is powered by a standard AC power outlet common in walls, the security device can include a reset that involves reconnecting the AC power supply. If the equipment is portable and is powered by a DC power supply as is common in most batteries, the security device can include a reset that involves entrance of a password.

21 Claims, 2 Drawing Sheets

ALARMCARD

BACKGROUND OF THE INVENTION

The present invention relates to an alarm device to prevent the theft of computers or microprocessor controlled equipment that remain stationary in use. The alarm becomes active and emits a sound whenever the computer or equipment is moved from its stationary position.

There is currently a number of alarm or security devices in the marketplace that become activated upon movement of a computer or appliance. The U.S. Pat. Nos. 4,686,514 and 4,494,114 disclose two such security devices. The U.S. Pat. No. 4,686,514 to Liptak uses an internal alarm which is armed and disarmed through an external key lock. The alarm becomes energized when the AC power supply of the appliance is disconnected and the appliance is physically moved from its normal stationary position. The alarm continues to sound until the appliance is moved back to a stationary position. Liptak's alarm device suffers from a number of disadvantages. First, the device can only be used for wall-powered computers and cannot be adapted for portable computers. Second, the external key lock warns the potential thief that the computer has an alarm and the thief may be able to defeat or destroy the manually operated key lock. And finally, the key lock presents problems as to how many keys are issued and to what personnel, re-keying the lock when one key is lost, and possible duplication of keys by nonauthorized personnel.

The U.S. Pat. No. 4,494,114 discloses a security device that uses a password entered through a keyboard of the microprocessor-based appliance to enable the appliance to be used. If a disabling event occurs to the appliance the security device renders the appliance inoperative. This security device also suffers from a number of disadvantages. First, the appliances must be manufactured with the security device pre-installed. This means that existing computers would not be able to be adapted or modified to include this security system. Second, the security device assumes the potential thief is familiar with the particular appliance and its security system and would not steal the computer or appliance because they would not be able to make the equipment operative. Such previous knowledge may be an inappropriate assumption for many thieves and the security device would become an ineffective theft deterrent. And finally, the password must be given to all of the personnel that use the equipment rather than limiting the password to the personnel authorized to move the equipment and allowing many other people to use the equipment.

SUMMARY OF THE INVENTION

It is an object of this invention to provide a security device for computers and the like which overcome the drawbacks associated with the prior art security devices.

Another object of the invention is to provide a security device with an independent power supply.

Another object of the invention is to provide a security device which may be easily installed into existing computers or microprocessor-based equipment and is hidden from view once installed.

Another object of the invention is to provide a security device which may be armed and disarmed from a keyboard of the computer or equipment and may be programmed to allow only authorized personnel to arm and disarm the security device.

It is a further object of the invention to provide a security device which may be used with portable computers and equipment.

Other objects of the invention will be apparent hereinafter from the specification and from the recital of the appended claims, particularly when read in conjunction with the accompany drawings.

The present invention comprises an alarm which is internally mounted within a computer or the like and emits a sound when an unauthorized attempt is made at moving the computer. The alarm is controlled by a circuit card which slides into and mounts within an expansion slot of the computer. The alarm is hidden from view once the device is completely installed and is powered by an independent battery.

Once the device is installed, the circuit card allows the device to be programmed through the computer's keyboard or other input device (mouse, touch screen, etc.) which controls the software that comes with the security device. The software allows an authorized person to arm and disarm the alarm and further allows a higher authorized person to change the arming password.

The present invention discloses a very useful and easily adaptable security alarm device which is specifically used to prevent theft of computers or similar equipment and does not have many of the drawbacks associated with previous computer security devices.

DETAILED DESCRIPTION OF THE INVENTION

Figure 1:
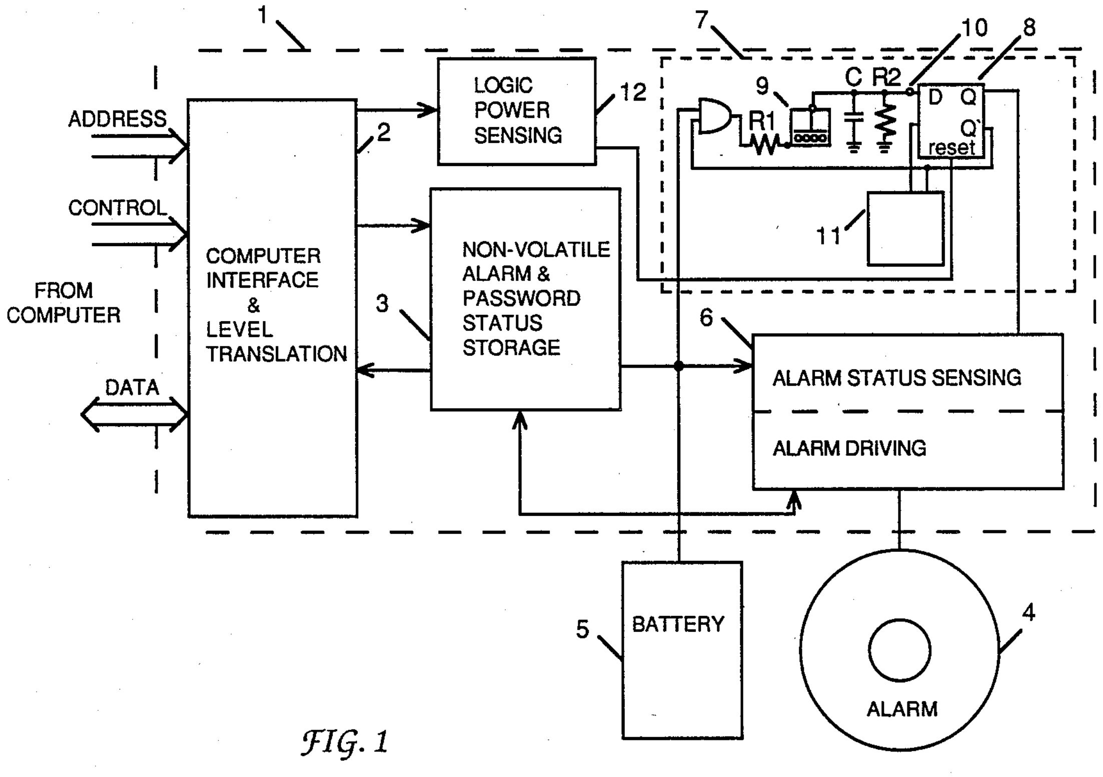
FIG. 1 shows an electronic schematic block diagram of the alarm security device of the present invention.

FIG. 1 shows a preferred embodiment of the circuit used in the alarm device for a wall powered computer. The alarm circuit card 1 and the computer, not shown in FIG. 1, are interconnected via the computer interface 2. The computer interface receives the address and data from the computer keyboard which operates the alarm device. The interface also includes level translation circuitry which provides conversion between computer powered circuits and battery powered circuits within the alarm circuit card. Upon receiving the address and data from the keyboard, the computer interface writes the data to the alarm status storage 3. This status storage is nonvolatile memory such as RAM. One part of this memory can be devoted toward storing a password, but the alarm device can be operated without a password if desired.

The alarm status storage holds the data entered in from the keyboard which comes in five forms: a test signal, a battery check signal, a horizontal arming signal, a vertical arming signal, and password signals. The test signal directly tests the alarm 4 to determine whether the appropriate warning signal is emitted. The battery check signal tests the battery 5 to determine if the battery has sufficient power to continue to monitor and control the alarm. The password signals check to see if the password entered from the keyboard matches the password associated with arming or disarming the alarm. The vertical and horizontal arming signals arm the vertical and horizontal arming circuits as will be explained later in detail.

The alarm status sensing and alarm driving component 6 is achieved through one circuit comprising a smoke detector chip. As is common in smoke detectors, this chip is needed to test the alarm, check the battery power, and drive the alarm when a predetermined condition exists. In the present invention the predetermined condition which drives the alarm is not a smoke detection circuit, but rather a vibration/level sensing and latching circuit 7.

Smoke detector circuits, password identification circuits, and computer interfaces are all old and well known in the prior art of electronics and are merely depicted in blocks within FIG. 1. The vibration level sensing and latching circuit 7 is shown within the dashed lines and is broken down into its individual components. The alarm latch 8 controls the alarm. When Q is high the alarm sounds. Before this condition can exist, the alarm status storage 3 must indicate that the alarm is armed and the level switch 9 must be closed. The level switch can be either a vertical level switch or a horizontal level switch. Both types of switches can be included within the circuit if desired by placing in series an identical circuit with the opposite level switch to the latching circuit 7. In this case, a separate operational step of arming either the vertical or horizontal switch would be required. When the computer is left in the normally stationary position the level switch remains open; however, if the computer is physically moved, the level switch becomes disturbed and closes the switch which subsequently sends the tilt/vibration signal 10 to the alarm latch at D.

Another feature within the sensing and latching circuit is the low power sample oscillator 11. The oscillator provides a sampling signal to the alarm latch rather than allowing a continuous signal to the circuit so that battery power may be saved. Hence, after a predetermined amount of time the oscillator sends a signal through the circuit to determine whether the level switch has been disrupted. During the time between these intervals no further power drain is exacted on the battery 5. Once, the tilt signal 10 is sent to the latch high on Q, the alarm is sounded and is latched until reset occurs. This effectively shuts down the sample oscillator which further saves on battery power.

Along with the password identification feature the alarm circuit can also optionally include a computer logic power sensing circuit 12. This circuit senses whether the computer is powered on or not. If the computer is physically moved while it is powered on, the AND gate prevents the alarm from sounding because the latch 8 is reset low at Q due to the power sensing circuit. The reason for this feature is that a computer may be inadvertently bumped while in use and it is not desired for the alarm to sound under these conditions. However, a potential thief must remove the wall socket plug from the computer in order to steal the computer. Under the latter condition the alarm will sound. The resistors R1 and R2 and the capacitor C hold the tilt/vibration signal 10 when the computer is moved while the power is "on". This holding of the tilt signal makes it more likely that a pulse will be sent by the sample oscillator 11 while the computer is in transit and the level switch remains closed.

Figure 2:
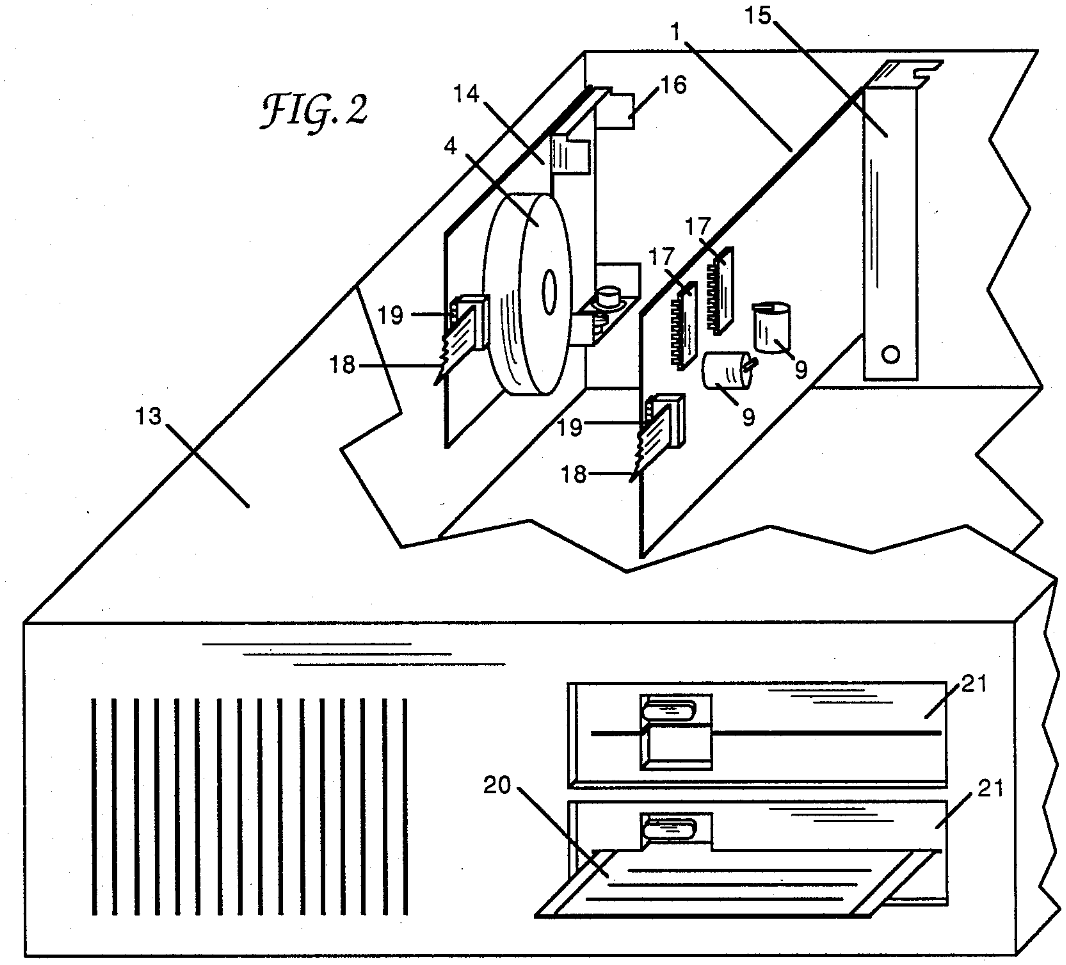
FIG. 2 shows a cutaway perspective view of a computer with the security alarm device and associated controlling software of the present invention installed therein.

FIG. 2 shows a perspective view of a computer 13 with the alarm device installed therein. Installation of the alarm system is simple and straightforward. Once the cover of the computer is removed, the alarm 4 and battery 5 are mounted to a flat surface within the computer as shown. The battery and alarm are mounted on a flat base 14 which is easily attached to a flat computer surface via tape or Velcro TM. This avoids the additional problems of drilling holes within the computer to mount the device and leaves the device hidden within the interior of the computer once the cover is secured back onto the computer. The circuit card 1 is slidably installed within an empty expansion slot, not shown for clarity purposes, which are standard on most computers. The mounting bracket 15 of the circuit card is secured to the computer via screws. The circuit card contains many of the components explained above with reference to the schematic diagram including the horizontal and vertical sensing switches 9 and all of the microchips 17, only two of which are shown in FIG. 2. The final installation step involves connecting the alarm unit to the circuit card. This interconnection is accomplished through a flat cable 18 of which only the ends appear in FIG. 2. The flat cable is attached to the alarm and circuit card through electrical connectors 19. Once the cable is connected to both parts, the cover of the computer may be reattached and the device is ready for use.

Operation of the alarm system comprises three major steps. The first step involves powering on the computer, booting up the computer's operating system, and inserting the alarm system software 20 into one of the computer's disc drives 21 subsequently booting up the alarm system program. Whenever the program is called up, the circuit card will automatically test the battery, test the alarm and write the results back to the computer screen.

The second step of the operation deals with password control of the alarm system and is optional within the present invention. In other words, the user may choose to not have a password associated with arming and disarming the alarm. In this case, only those persons with access to the software can arm and disarm the alarm system. The software, in effect, becomes a key. If a person desires greater security, a password may be selected and given out only to those persons with the authority to arm and disarm the alarm or move the computer. This would allow many people to still use the computer, but only a selected few to operate the alarm. A third level of security would include the use of two passwords. The first password would allow the same selected few individuals to operate the alarm, but the second password could be given out to only one or two individuals having the authority to change the password. This level of security would prevent inadvertent change of the password and could be used to tighten security if it is believed that the password has been given out to too many individuals.

Once the password has been entered, the program displays a menu and allows the user to operate the alarm system. This is the third step within the operation. Operation of the menu includes arming the alarm for a horizontal or vertical configuration of the computer, disarming or clearing the alarm setting, or setting the alarm to occur on power loss.

The alarm system can be sounded in one of three ways as chosen by the alarm operator. The first is the sounding of the alarm upon the entrance of three incorrect passwords. This feature is an optional one. Once the alarm is sounded in this manner it cannot be turned off until the alarm software is rebooted. The second way to sound the alarm is when the computer's power supply is interrupted or shut off. This feature would be key for systems that need to be powered on continuously 24 hours a day. Again, this feature is optional from the program menu and would require the alarm software to be rebooted to stop the alarm. The third way the alarm sounds is if the computer is physically moved causing the horizontal or vertical level sensing switches to close. In the normal mode of operation, the alarm circuit must sense both that the computer power is off through the computer logic power sensing circuit 12 and that the computer is being moved through the level sensing circuit 7. In this mode, the alarm may be stopped by powering the computer back on. This feature would allow the alarm to be stopped if the computer is accidentally moved for any reason by a person that does not have access to the alarm program.

Another embodiment of the invention would be to adapt the alarm device for use in a portable computer. In this case, a separate battery would not be needed and the alarm could be powered by the computer's battery source. The power sensing circuit 12 of FIG. 1 would be replaced with additional circuitry within the password identification circuit. The portable embodiment of this invention would be installed an operate in a similar manner to the wall powered embodiment. The exception is that in operation if the computer is physically moved and the alarm sounds, the only way that the alarm can be turned off is if the alarm software program is called up and the password is entered.

It should be apparent that many modifications could be made to the alarm device which would still be encompassed within the spirit of the present invention. It is intended that all such modifications may fall within the scope of the appended claims.

What is claimed is:

1. A security device for use with equipment having a microprocessor comprising:

a warning means responsive to a change in the equipment from a predetermined condition of the equipment;

a driving means for driving said warning means;

a sensing means for sensing said change from said predetermined condition, said sensing means capable of sending a signal to said driving means in response to said change from said predetermined condition;

an interface means for connecting the equipment to said security device, said interface means capable of inputting information from the microprocessor of the equipment through said security device; and, program means for controlling the warning means, driving means, and sensing means, said program means capable of transmitting information to the microprocessor of the equipment.

2. A security device as claimed in claim 1, wherein, said warning means comprises an alarm capable of emitting a sound when the equipment is changed from said predetermined condition.

3. A security device as claimed in claim 2, wherein, said alarm comprises a latching means for latching the alarm in a sounding position, said alarm further comprising reset means for unlatching the latching means.

4. A security device as claimed in claim 2, wherein, said alarm comprises an alarm testing means for allowing said alarm to be sounded while said predetermined condition exists.

5. A security device as claimed in claim 1, wherein, said interface means is capable of outputting information from said security device to the equipment.

6. A security device as claimed in claim 1, wherein, said security device further comprises an independent power supply separate from the equipment.

7. A security device as claimed in claim 6, wherein, said independent power supply comprises a DC battery.

8. A security device as claimed in claim 7, wherein, said interface means is capable of outputting information from said security device to the equipment, and said security device comprises a battery testing means which is capable of outputting information on the strength of the battery to the equipment via said interface means.

9. A security device as claimed in claim 1, wherein, said sensing means comprises a vibration sensing means for detecting physical movement of the equipment.

10. A security device as claimed in claim 1, wherein, said sensing means comprises a power sensing means for detecting a loss of power to the equipment.

11. A security device as claimed in claim 1, wherein, said sensing means comprises a vibration sensing means for detecting physical movement of the equipment, and said sensing means comprises a power sensing means for detecting a loss of power to the equipment.

12. A security device as claimed in claim 1, wherein, said sensing means is capable of existing in an activated position for sensing a change from said predetermined condition and a deactivated position where said sensing means cannot detect a change from said predetermined condition, said security device further comprising an arming means for moving the sensing means between said activated and deactivated positions.

13. A security device as claimed in claim 12, wherein, said predetermined condition is a stationary position of the equipment and said arming means includes means for allowing the predetermined condition to be stationary in a vertical or horizontal position relative to some level datum.

14. A security device as claimed in claim 12, wherein said security device further comprising a first password means for allowing said arming means to be inoperative unless a correct first password is input from the equipment to said security device.

15. A security device as claimed in claim 14, wherein, said warning means comprises an alarm capable of emitting a sound when the equipment is changed from said predetermined condition, said alarm comprises a latching means for latching the alarm in a sounding position, said alarm further comprising reset means for unlatching the latching means, and said reset means responsive to the input of said first password from the equipment to said security device.

16. A security device as claimed in claim 14, wherein, said first password means includes a means for changing said first password, said security device further comprising a second password means for rendering said changing means inoperative unless a correct second password is input from the equipment to said security device.

17. A security device as claimed in claim 1, further comprising, storage means for statically storing said program means, said storage means allowing said program means to be changed.

18. A security device as claimed in claim 1, wherein, said program means further comprises means for prompting a user of the equipment to provide said input information for controlling said warning means, driving means, and sensing means.

19. A security device as claimed in claim 1, wherein, said interface means is capable of inputting information in text form.

20. A kit for providing a security device to microprocessor controlled equipment, comprising:

a warning means responsive to a change in the equipment from a predetermined condition of the equipment;

a driving means for driving said warning means;

a sensing means for sensing said change from said predetermined condition, said sensing means capable of sending a signal to said driving means in response to said change from said predetermined condition;

interface means for interpreting input information received from the microprocessor of the equipment;

a mounting bracket for attachment to the interior of the equipment, said mounting bracket providing a base for mounting said warning means, said driving means, said sensing means and said interface means;

means to connect said interface means to the microprocessor of the equipment; and means to control said security device, said control means located separately from said mounting bracket.

21. A kit as claimed in claim 20, further comprising, program means within said control means for controlling the warning means, driving means, sensing means, and interface means; said program means capable of transmitting information to the microprocessor of the equipment; and means for storing said program means, said storage means located separate from said mounting bracket.

* * * * *